United States Patent [19]

Huelster

[11] Patent Number: 4,891,934
[45] Date of Patent: Jan. 9, 1990

[54] OIL SYSTEM FOR GAS TURBINE ENGINE
[75] Inventor: David S. Huelster, Indianapolis, Ind.
[73] Assignee: General Motors Corporation, Detroit, Mich.
[21] Appl. No.: 264,575
[22] Filed: Oct. 31, 1988
[51] Int. Cl.[4] ............................................. F02C 7/06
[52] U.S. Cl. .................................. 60/39.08; 184/6.4; 184/6.11
[58] Field of Search ................ 60/39.08; 184/6.4, 6.11

[56] References Cited

U.S. PATENT DOCUMENTS

| | | | |
|---|---|---|---|
| 3,779,345 | 12/1973 | Barnes et al. .......................... | 184/6.4 |
| 4,002,224 | 1/1977 | Easter ................................... | 60/39.08 |
| 4,153,141 | 5/1979 | Methlie ................................. | 184/6.4 |
| 4,284,174 | 8/1981 | Salvana et al. ....................... | 184/6.4 |
| 4,309,870 | 1/1982 | Guest et al. .......................... | 60/39.08 |
| 4,373,421 | 2/1983 | Camboulives et al. ............. | 60/39.08 |
| 4,390,082 | 6/1983 | Swearingen ......................... | 60/39.08 |
| 4,433,539 | 2/1984 | Norris et al. ........................ | 184/6.11 |
| 4,569,196 | 2/1986 | Waddington et al. ............... | 184/6.4 |
| 4,717,000 | 1/1988 | Waddington et al. ............... | 184/61 |
| 4,741,155 | 5/1988 | McCarty ............................. | 69/39.02 |

FOREIGN PATENT DOCUMENTS 2130308  5/1984  United Kingdom ............... 184/6.11

Primary Examiner—Donald E. Stout
Attorney, Agent, or Firm—Saul Schwartz

[57] ABSTRACT

An oil system for a gas turbine engine including a supply circuit having a main pump supplied from a reservoir tank and discharging in bearing sumps of the engine, a scavenge circuit having a plurality of scavenge pumps supplied from the sumps of the engine and discharging back to the reservoir tank, and a distributing valve in the supply and the scavenge circuits operative when main pump discharge pressure is below a threshold pressure characteristic of main pump interruption to connect the scavenge pump discharge to the supply circuit so that residence oil in the supply circuit is recirculated to maintain bearing lubrication after main pump interruption.

4 Claims, 2 Drawing Sheets

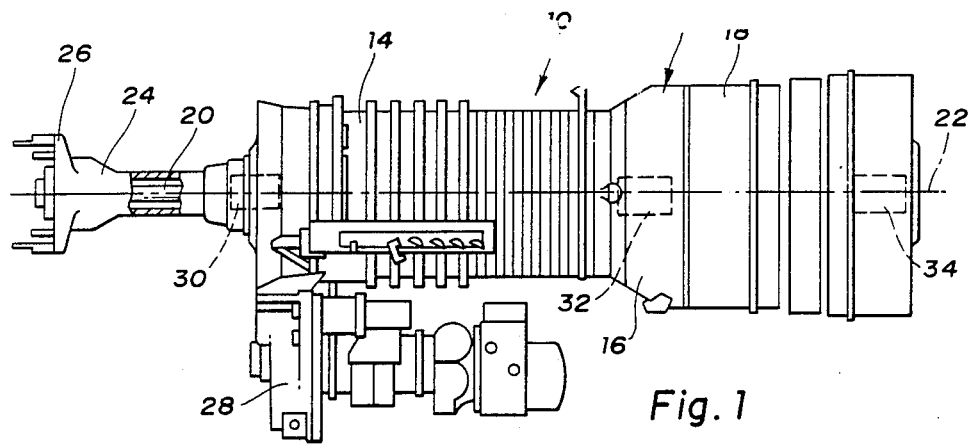
Fig. 1
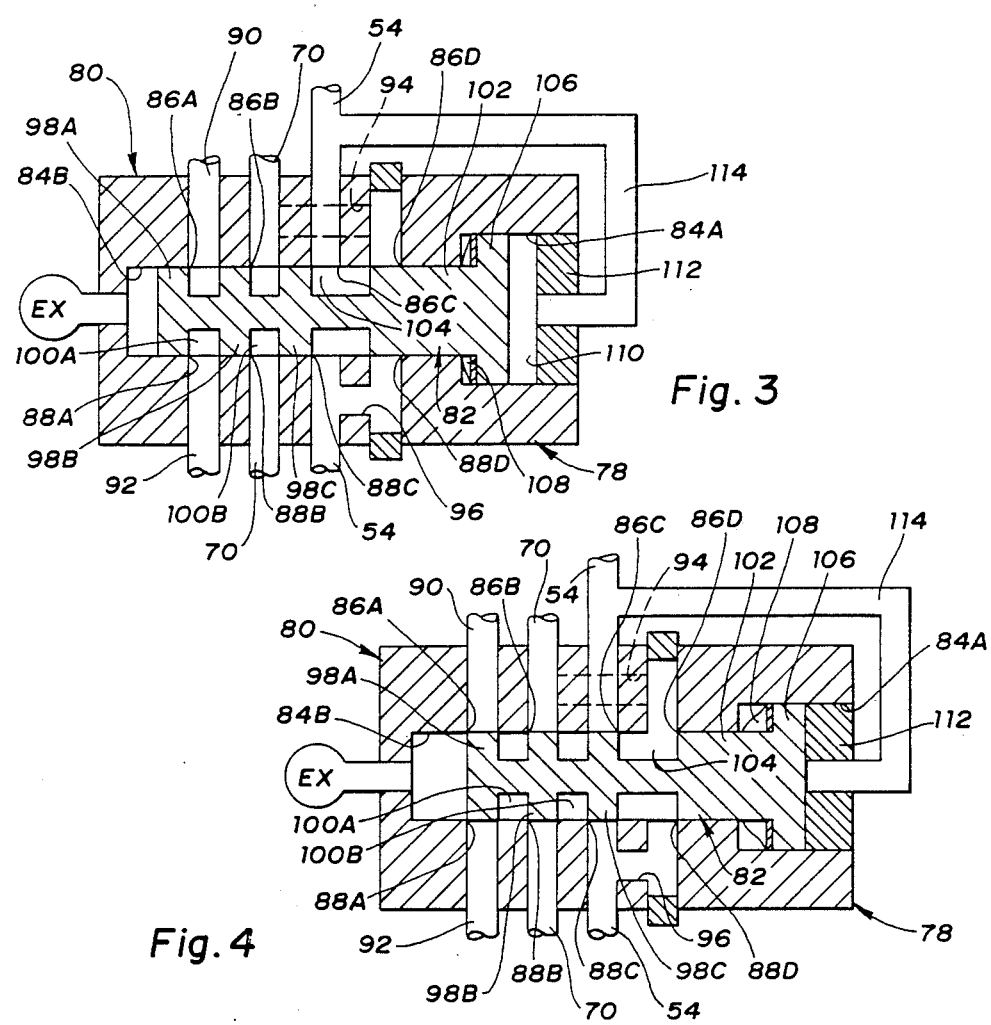
Fig. 3
Fig. 4

OIL SYSTEM FOR GAS TURBINE ENGINE

This invention was made under a contract or subcontract of the U.S. Department of Defense.

FIELD OF THE INVENTION

This invention relates to oil systems for gas turbine engines.

BACKGROUND OF THE INVENTION

For some applications, such as aircraft propulsion, performance specifications dictate that gas turbine engines have operational capability for a predetermined, limited duration after the oil supply from the usual main oil pump of the engine is interrupted. In prior proposals for secondary oil systems for sustaining engine operation for the aforesaid limited duration, oil from a separate reservoir on the engine is conducted to a point of use by centrifugal force induced pressure, by gravity or by air pressure. In other proposals, the oil is aspirated from the separate reservoir by a stream of high velocity air. Usually, the oil from the separate reservoir is dispersed as a mist or maximizing the duration of engine operation after main pump interruption. In a gas turbine engine oil system according to this invention, the portion of the oil system between the main pump discharge and the points of application defines an integral reservoir from which oil is recirculated by the engine's scavenge pumps in the absence of main pump discharge.

SUMMARY OF THE INVENTION

This invention is a new and improved gas turbine engine oil system including a supply circuit, a scavenge circuit, and a distributor valve between the supply and the scavenge circuits. The supply circuit has an engine driven main pump for normally supplying oil to a nozzle in a sump of the engine and retains a volume of residence oil during normal engine operation. The scavenge circuit has an engine driven scavenge pump for normally collecting oil from the sump and returning it to a reservoir which supplies the main pump. The distributor valve has an off or inactive condition and an on or active condition corresponding, respectively, to main pump discharge pressure above and below a predetermined threshold pressure. Main pump discharge pressure above the threshold pressure is characteristic of normal main pump operation. Main pump discharge pressure below the threshold pressure is characteristic of main pump interruption. In the off condition, the distributor valve separates the supply and scavenge circuits. In the on condition, the distributor valve disconnects the main pump discharge from the supply circuit while concurrently connecting the scavenge pump to the supply circuit whereby the scavenge pump recirculates the residence oil in the supply circuit to sustain the engine. In a preferred embodiment of the oil system according to this invention, the supply circuit further includes an oil filter and an oil cooler and the distributor valve is connected to the supply circuit between the main pump discharge and the nearest of the filter and cooler so that the maximum proportion of the residence oil is retained for recirculation.

BRIEF DESCRIPTION OF THE DRAWINGS

FIG. 1 is a partially broken away side elevation of a gas turbine engine having an oil system according to this invention;

FIG. 3 is an enlarged schematic representation of a distributor valve of the gas turbine engine oil system according to this invention showing the valve in an off condition corresponding to normal engine operation; and FIG. 4 is similar to FIG. 3 but showing the distributor valve in an on condition corresponding to interruption of main oil pump discharge.

DESCRIPTION OF PREFERRED EMBODIMENT

Figure 2:
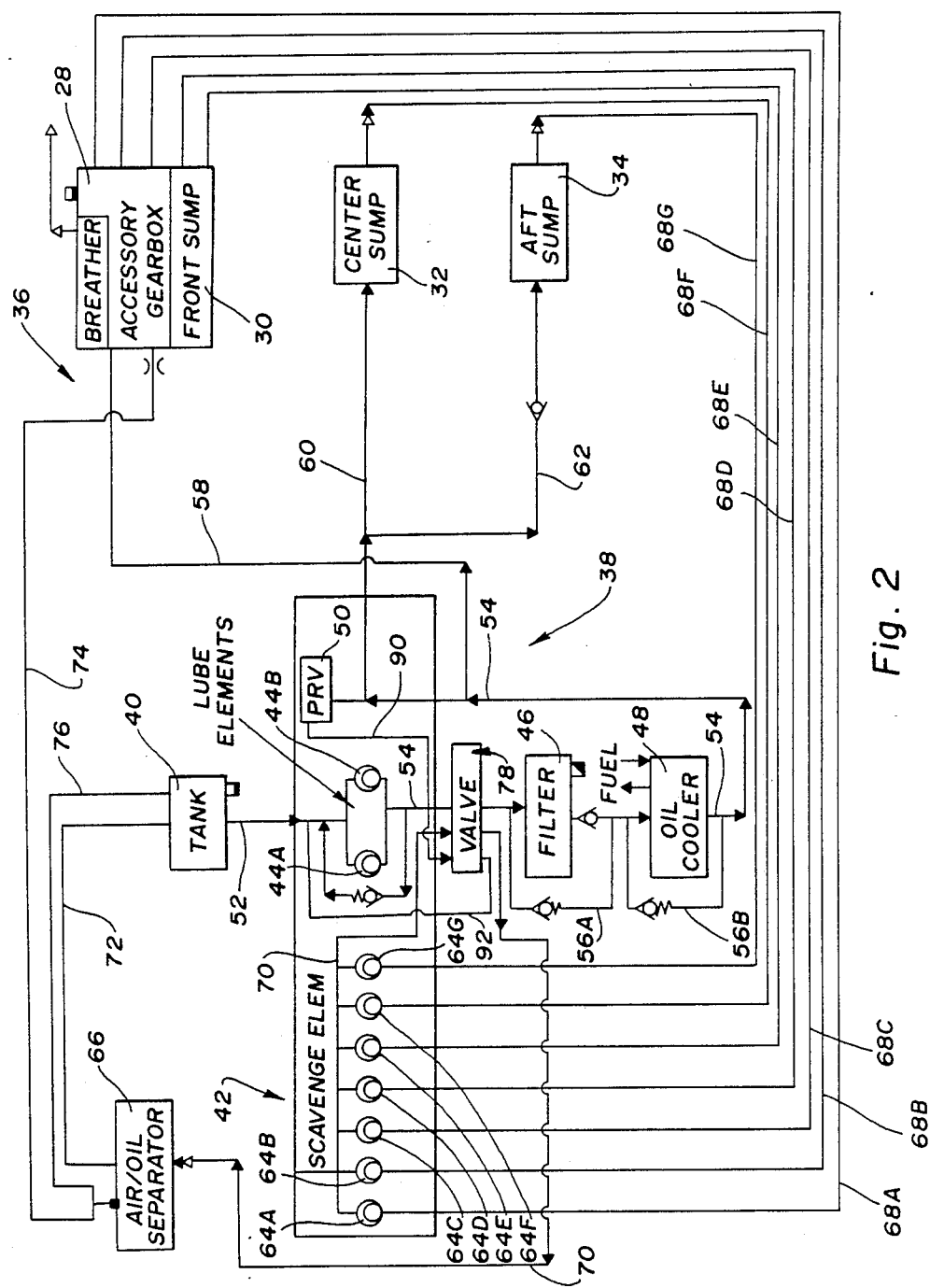
FIG. 2 is a schematic diagram of the gas turbine engine oil system according to this invention.

Referring to FIG. 1 of the drawings, a gas turbine engine 10 suitable for aircraft flight propulsion includes a rigid structural case 12 having a compressor section 14 defining the front part of the engine, a center combustor section 16, and a turbine section 18 defining the aft part of the engine. The engine is mounted on an airframe through suitable attachments, not shown, to the case. Air entering at the front end of the compressor section 14 is compressed by a multi-stage axial compressor in the compressor section and mixed with fuel in an annular combustor in the combustor section 16 for production of hot gas motive fluid.

Energy is extracted from the motive fluid to drive the compressor by a multi-stage gasifier turbine in the forward part of the turbine section 18. Further energy is extracted from the motive fluid by an additional multi-stage power turbine in the turbine section 18 aft of the gasifier turbine. The power turbine is connected to an output shaft 20 rotatable on a main axis or longitudinal centerline 22 of the engine and extending beyond the front of the compressor section 14 within a torque tube 24 of the case 12. The front end of the output shaft is adapted for connection to reduction gearing in a gearbox, not shown, which may be bolted to a front flange 26 of the torque tube 24. An accessory gearbox 28 attached to the case 12 of the engine houses various accessory units such as pumps and electrical generating equipment which are engine driven through gear trains between the output shaft 20 and the individual accessories.

The output shaft 20, the compressor, and the turbines are supported on the case 12 for rotation about the main axis 22 by bearings, not shown, located in bearing sumps of the engine such as, for example, a schematically represented front sump 30, a schematically represented center sump 32, and a schematically represented aft sump 34. The sumps prevent contamination of internal engine components by confining lubricating oil sprayed or otherwise applied to the bearings. In addition, the sumps serve to concentrate the lubrication oil for return to a central supply tank or reservoir. Similarly, the accessory gear box 28 has a sump portion in which oil for lubricating the accessory gear trains is concentrated for return to the central supply tank. An oil system 36, FIG. 2, according to this invention supplies oil to the bearings and other components in the sumps and scavenges oil from the various sumps of the engine.

FIG. 2 is a schematic diagram of the oil system 36 according to this invention in which the connections between the various elements of the system are illustrated, and referred to in the description below, only as lines. The oil system 36 according to this invention has a supply circuit 38 for normally conducting oil from a supply tank 40 to the components in the sumps 30,32,34 and a scavenge circuit 42 for normally collecting or scavenging oil from the sumps and returning it to the supply tank. The supply circuit 38 has a plurality of conventional elements therein including a pair of engine driven main oil pumps 44A-B, an oil filter 46, an oil cooler 48, and a pressure regulating valve 50.

The supply circuit has a plurality of lines whereby the oil is conducted from the supply tank to nozzles, not shown, in each of the sumps 30,32,34 of the engine including a supply line 52 from the tank 40 to the inlet of each pump and a discharge line 54 from the outlet of each pump to the pressure regulating valve 50. The oil filter 46 and the oil cooler 48 are disposed in series connection in the discharge line 54 which is protected against blockage by a pair of bypasses 56A-B around the oil filter and oil cooler, respectively. A first branch line 58 of the discharge line 54 downstream of the oil cooler supplies nozzles in the front sump 30 and in the accessory gearbox 28. A second branch line 60 of the discharge line 54 downstream of the oil cooler 48 supplies nozzles in the center sump 32 and, through a third branch line 62, nozzles in the aft sump 34.

The scavenge circuit 42 has a plurality of conventional elements therein including a plurality of individual, engine driven scavenge pumps 64A-G and an air-oil separator 66. A plurality of scavenge lines 68A-G connect the inlets of respective ones of the scavenge pumps 64A-G to the sumps 30,32,34 as shown whereby the pumps continuously withdraw a frothy oil/air mixture from the sumps. The scavenge pumps 64A-G discharge the oil/air mixture through respective ones of a plurality of discharge lines into a common collector line 70 which delivers the total scavenge flow to the separator 66. The oil in the froth is disassociated from the air in the separator 66 and returned to the supply tank 40 through a return line 72. Air in the froth dissociated from the oil is vented to the accessory gearbox 28 through a vent line 74 and then to the atmosphere. The supply tank is vented to atmosphere by a vent line 76 connected to the vent line 74.

Referring to FIGS. 2-4, a distributor valve 78 is interposed in the main pump discharge line 54 of the supply circuit 38 between the oil filter 46 and the outlets of the main pumps 44A-B. The distributor valve is also interposed in the common collector line 70 of the scavenge circuit between the separator 66 and the scavenge pumps 64A-G. The distributor valve 78, illustrated schematically in FIGS. 3 and 4, includes a housing 80 and a valve spool 82. The housing 80 has a bore therein with a big diameter part 84A and small diameter part 84B. The housing also has a plurality of upstream ports 86A-D and a corresponding plurality of downstream ports 88A-D opposite the upstream ports.

An overage line 90 from the pressure regulating valve 50 is connected to the first upstream port 86A in the housing 80. An average return line 92 is connected from the opposite downstream port 88A back to the supply line 52 to the main pumps. The second upstream and downstream ports 86B and 88B are connected in series flow relationship with the common collector 70 between the separator 66 and the scavenge pumps. The third upstream and downstream ports 86C and 88C in the housing are connected in series flow relationship in the main pump discharge line 54 between the main pumps 44A-B and the oil filter 46. The fourth upstream port 86D in the housing is connected to the common collector line 70 ahead of the second upstream port 86B by a first shunt passage 94 in the housing. The fourth downstream port 88D in the housing is connected to the main pump discharge line 54 behind the third downstream port 88C by a second shunt passage 96 in the housing.

The valve spool 82 has three narrow cylindrical valve lands 98A-C closely received in the small diameter housing bore 84B and separated by a pair of annular reliefs 100A-B and a wide cylindrical land 102 separated from the narrow land 98C by an oversize annular relief 104. A piston 106 of the valve spool is slidably received in the big diameter bore 84A and an annular wave spring 108 around the valve spool is disposed in a vented annular spring chamber defined between the piston 106 and the valve housing. The spring 108 urges the valve spool 82 to the right, FIGS. 3 and 4. A pressure chamber 110, FIG. 3, is defined between the piston 106 and a cap 112 on the housing 80 closing the big diameter bore 84A. A control pressure branch line 114 is connected to the main pump discharge line 54 between the main pumps and the distributor valve 78 and is open to the pressure chamber 110 through the cap 112.

The oil system 36 operates as follows. When the engine is off, the main pumps deliver no oil and the spring 108 biases the valve spool to an extended position, FIG. 4, characteristic of an on condition of the distributor valve 78. In the extended position of the valve spool, the narrow lands 98A-C block respective pairs of upstream and down stream ports 86A-C and 88A-C while the fourth upstream port 86D communicates with the fourth downstream port 88D through the wide relief 104.

As the oil pressure in the main pump discharge line 54 quickly reaches normal levels during the engine start sequence, oil pressure acting on the piston 106 shifts the valve spool 82 from its extended position to a retracted position, FIG. 3, characteristic of an off condition of the distributor valve 78. In the retracted position of the valve spool, the first upstream and downstream ports 86A and 88A communicate through the relief 100A, the second upstream and downstream ports 86B and 88B communicate through the relief 100B, the third upstream and downstream ports 86C and 88C communicate through the wide relief 104, and the fourth upstream and downstream ports 86D and 88D are blocked by the wide land 102.

The off condition of the distributor valve corresponds to normal engine operation during which the distributor valve maintains separation between the supply and scavenge circuits. That is, oil at normal discharge pressure from the main pumps traverses the connected third upstream and downstream ports 86C and 88C and circulates through the supply circuit 38. Likewise, scavenge pump discharge in the common collector 70 traverses the connected second upstream and downstream ports 86B and 88B and returns to the tank 40 through the separator 66. Overage from the pressure regulator valve 50 returns to the supply line 52 by way of the open first upstream and downstream ports 86A and 88A.

The on condition of the distributor valve corresponds to operation of the engine after the supply of fluid to the main pumps 44A-B is interrupted. In that situation, the oil pressure in the discharge line 54 and in the pressure chamber 110 rapidly decays to below a threshold magnitude necessary to hold the spool 82 in the retracted position, FIG. 3, against the spring 108. Below the threshold oil pressure, the spool 82 is shifted by the spring to its extended position, FIG. 4, connecting the scavenge circuit 42 to the supply circuit 38 and closing the supply circuit to prevent oil loss by way of regulator valve average.

More particularly, in the on condition of the distributor valve, the narrow spool lands 98A-C block respective pairs of upstream and downstream ports 86A-C and 88A-C so that overage from the pressure regulator valve cannot reach the pump supply line 52, scavenge pump discharge in the common collector 70 cannot reach the separator 66, and the essentially oil less discharge from the main pumps 44A-B is blocked at the upstream port 86C. Concurrently, however, a flow path is established from the common collector 70 to the main pump discharge line 54 behind the downstream port 88C through the first shunt branch passage 94, the open fourth upstream and downstream ports 86D and 88D, and through the second shunt passage 96.

The scavenge pumps, being engine driven, collect the residence fluid in the supply circuit from the sumps 30,32,34. However, instead of returning the collected fluid to the tank 40 the distributor valve 78 routes the fluid back to the supply circuit 38 so that the fluid recirculates through the filter and the cooler to the nozzles in the sumps. The recirculating oil does not pass through the separator 66 when the distributor valve 78 is in the on condition so that the recirculation includes oil/air froth. Recirculation of such froth, however, which is normally advantageously avoided, is not inconsistent with engine performance specifications dictating maintenance of engine operation for only a relatively short duration of on the order of ten minutes after interruption of oil supply to the main pumps.

The embodiments of the invention in which an exclusive property or privilege is claimed are defined as follows:

1. A gas turbine engine oil system comprising:
    a supply circuit including a reservoir and an engine driven main pump having an inlet connected to said reservoir and a discharge connected to a nozzle in a sump of said gas turbine engine,
        said supply circuit having a volume of residence oil between said main pump discharge and said nozzle when said main pump is operating,
    a scavenge circuit including an engine driven scavenge pump having an inlet connected to said sump and a discharge connected to said reservoir, and
    a distributor valve disposed in said supply circuit and in said scavenge circuit operative in response to oil pressure between said main pump discharge and said nozzle below a predetermined threshold magnitude to disconnect said main pump discharge from said supply circuit and to connect said scavenge pump discharge to said supply circuit whereby said residence volume of oil in said supply circuit is recirculated from said sump to said nozzle by said scavenge pump.

2. The gas turbine engine oil system recited in claim 1 wherein
    said supply circuit further includes an oil filter and an oil cooler between said main pump discharge and said nozzle and wherein
    said distributor valve is disposed in said supply circuit such that when said scavenge pump discharge is connected to said supply circuit said scavenge pump discharge is upstream of the one of said oil filter and said oil cooler nearest said main pump discharge so that said volume of residence oil for recirculation is maximized.

3. The gas turbine engine oil system recited in claim 2 wherein
    said scavenge circuit includes a single scavenge discharge duct connected to said distributor valve and a plurality of engine driven scavenge pumps connected to a plurality of sumps of said gas turbine engine each having a discharge connected to said common discharge duct so that oil from all of said plurality of sumps is recirculated when said scavenge circuit is connected to said supply circuit.

4. The gas turbine engine oil system recited in claim 3 wherein said distributor valve includes
    a valve housing,
    a valve spool disposed on said valve housing for movement between an extended position and a retracted position and including a plurality of valve lands and a piston,
    a spring biasing said valve spool to said extended position,
    means connecting said main pump discharge to said valve housing such that the pressure in said main pump discharge reacts against said valve spool piston so that said valve spool is held against said spring in said retracted position when the pressure in said main pump discharge is above a threshold magnitude,
    a first pair of valve ports in said housing in series flow relationship in said common scavenge pump discharge cooperating with a first of said plurality of valve spool valve lands such that said first pair of valve ports communicate in said retracted position of said valve spool and are blocked in said extended position of said valve spool,
    a second pair of valve ports in said housing in series flow relationship with said main pump discharge cooperating with a second of said plurality of valve spool valve lands such that said second pair of value ports communicate in said retracted position of said valve spool and are blocked in said extended position of said valve spool, and
    a third pair of valve ports in said housing in series flow relationship in a shunt passage in said valve housing extending from said common scavenge pump discharge upstream of said first pair of valve ports to said main pump discharge downstream of said second pair of valve ports and cooperating with a third of said plurality of valve spool lands such that said third pair of valve ports are blocked in said retracted position of said valve spool and communicate in said extended position of said valve spool.

* * * * *